United States Patent [19]

Gracie

[11] 3,838,402

[45] Sept. 24, 1974

[54] FILM STRIP READ-OUT APPARATUS WITH MOVABLE OPTICAL ELEMENT

[75] Inventor: Christopher Arthur James Gracie, Edinburgh, Scotland

[73] Assignee: Ferranti Limited, Hollinwood, Lancashire, England

[22] Filed: July 14, 1972

[21] Appl. No.: 271,781

[30] Foreign Application Priority Data

July 20, 1971 Great Britain .................... 34030/71

[52] U.S. Cl. ........................ 340/173 LM, 178/6.7 R

[51] Int. Cl. ............................................ G11c 13/04

[58] Field of Search .............. 340/173 LT, 173 LM; 179/100.3 L, 100.3 N; 350/160 R; 178/6.7 R

[56] References Cited

UNITED STATES PATENTS

| | | | |
|---|---|---|---|
| 3,403,260 | 9/1968 | Geusic | 340/173 LM |
| 3,438,050 | 4/1969 | Aschenbrenner | 340/173 LM |
| 3,448,458 | 6/1969 | Carlson | 340/173 LM |
| 3,466,389 | 9/1969 | Neiswander | 340/173 LM |
| 3,586,434 | 6/1971 | Mueller | 340/173 LM |

OTHER PUBLICATIONS

Chang, Nonimpact Printer, IMB Technical Disclosure Bulletin, Vol. 12, No. 3, 8/69, pp. 419–420.

*Primary Examiner*—Stuart N. Hecker
*Attorney, Agent, or Firm*—Cameron, Kerkam, Sutton, Stowell & Stowell

[57] ABSTRACT

Information storage apparatus has display information stored on a length of film and displayed by passing light from a source through the film and onto a viewing screen. The film also carries encoded digital information which is read out by modifying the optical system so that light from the source passing through the film is directed onto a plurality of light-sensitive devices.

12 Claims, 6 Drawing Figures

FILM STRIP READ-OUT APPARATUS WITH MOVABLE OPTICAL ELEMENT

This invention relates to information storage apparatus, and in particular to such apparatus for use as a back-up store for the computer controlling a moving-map display.

Many types of vehicle, particularly aircraft, use computer-controlled moving-map displays to indicate the position of the vehicle at any instant. Frequently the computer which controls the display is also used for other purposes. The computer requires a digital data store to enable it to carry out its functions, and frequently the data is stored in a manner which may be accidentally changed, say by a temporary power surge or failure. In such a case it is advisable, if not essential, to have a read-only back-up store which may be used to restore the computer store to its original state.

Also a back-up store may carry two or more separate programmes or parts of programmes ("sub-routines") which cannot be stored continuously in the main computer through lack of computer memory capacity. In this way a computer's versatility and power may be extended quite cheaply.

Such a back-up store may take many forms, but these almost inevitably involve a separate piece of equipment. In an aircraft space is often at a premium, and siting such a back-up store may be difficult. Equally, such a store will necessarily add to the expense of the computer associated with a moving-map display.

According to the present invention there is provided information-storage apparatus which includes a strip of film suitable for carrying information to be displayed and encoded digital information, a viewing screen, a light source and an optical system arranged to project an image of at least part of the display information onto the screen, a plurality of light-sensitive devices located away from the axis of the optical system, and means for modifying the said optical system in such a manner that light from the light source may be focussed on the film and thence onto the plurality of light sensitive devices to read out the encoded digital information.

The invention will now be described with reference to the accompanying drawings, in which.

Figure 1:
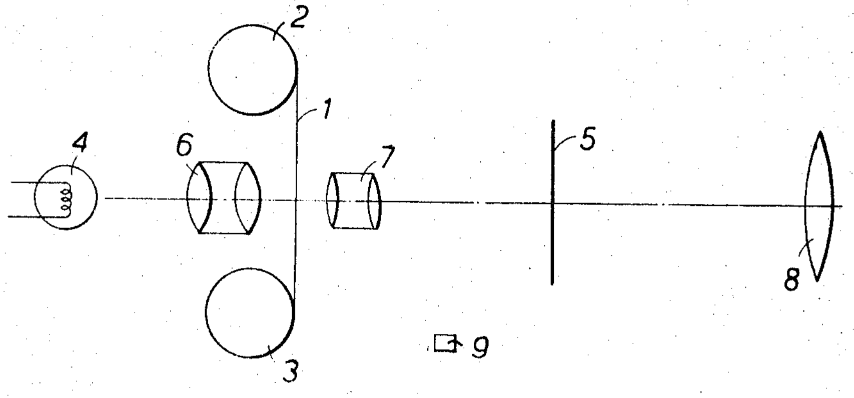
FIGS. 1 and 2 are schematic diagrams of the main parts of a moving-map display incorporating an optical back-up store according to a first embodiment of the invention.

Referring now to FIG. 1, the basic moving-map display equipment is centred around a length of film 1 carrying display information, say in the form of one or more topographical transparencies or charts. This film is stored on two reels 2 and 3 each of which has associated drive motors and servo system (not shown). A lamp 4 is used to project an image of part of the film 1 on to a translucent screen 5 through an optical system comprising a condenser lens 6 and a projection lens 7. The film 1 may be moved from one reel to the other to obtain movement in one co-ordinate direction, and the film reels are themselves mounted on a carriage which may be moved in a direction transverse to the length of the film. Thus any desired part of the film may be displayed, measuring means being provided to determine the precise position of the film at any instant. The screen 5 is viewed by an observer through a lens 8. A row of photo-electric devices 9 is located away from the optical axis of the projection system, extending in a direction transverse to the length of the film.

In use the display is controlled by a computer so that the terrain being displayed is that actually being transversed by the vehicle, though arrangements are provided so that the map may be moved — to enable the "driver" to "look-ahead," for example. The map is usually in the form of a number of separate sections, and rapid transport means are provided to move the film rapidly from one section to another as the vehicle moves out of the area covered by one section.

The back-up store for the computer controlling the display comprises a length of film carrying the necessary digital information in optically-encoded form. Conveniently this information will be located together on one length of film, which may, for example, be at one end or in the centre of the length carrying the transparencies. In order to read out this information the optical system has to be modified to enable the information to be scanned. This modification involves moving into position an elongated reflecting prism 10, located so as to intersect the optical axis and extending in a direction transverse to the length of the film. The row of photo-electric devices 9 is positioned so as to intercept the light reflected by the prism 10 and at a distance from the prism such that the light is focussed onto the photo-electric devices by the projection lens 7.

Figure 2:
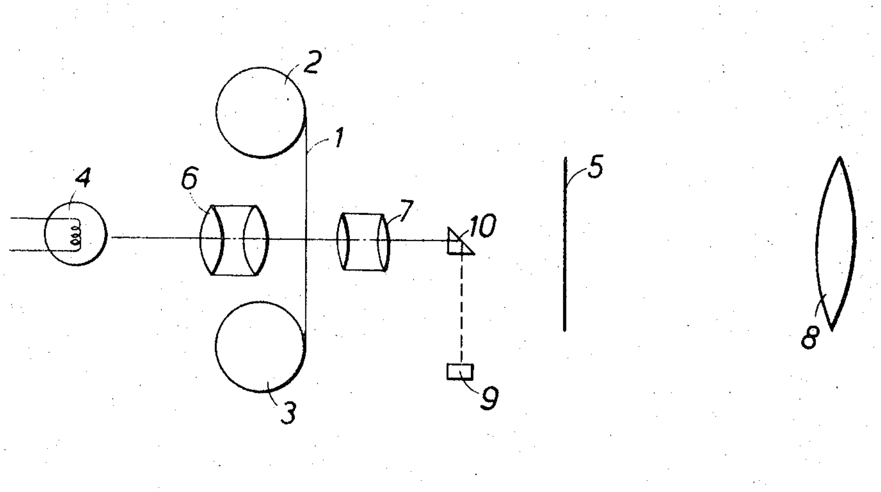

When the back-up store is required the prism is moved into the position shown in FIG. 2 along the axis of the optical system and the film is moved rapidly to the section containing the information. To read-out the information the film is moved steadily so that the images of the coded information fall successively on the row of photo-electric devices, each character being read out simultaneously in parallel from the row of detectors.

Figure 3:
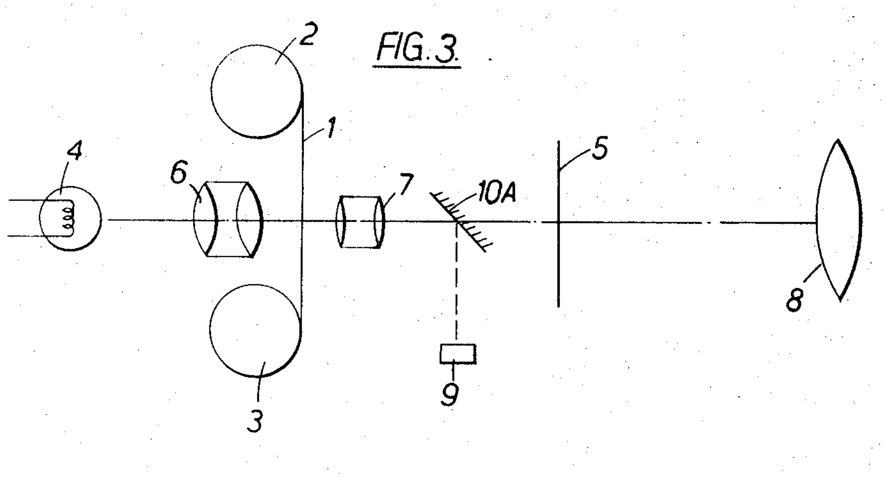
FIG. 3 illustrates a second embodiment.

FIG. 3 shows an embodiment almost identical to that of FIG. 2, except that the prism 10 of FIG. 2 is replaced by a mirror 10A.

Figure 4:
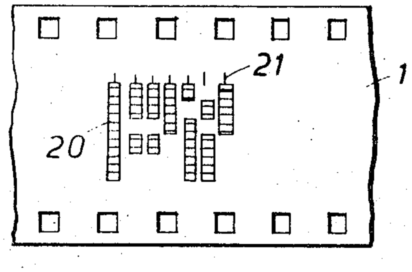
FIG. 4 illustrates one manner in which the digital information may be stored.

FIG. 4 illustrates one method of encoding the information on the film 1. The digits of a word are represented by opaque spots 20 on the film arranged across the film, this also being the reading axis. Successive words are arranged in order along the length of the film. It is possible to synchronise the reading rate of the scan with the film transport speed, but it is simpler to provide means for detecting the beginning and end of each word. Conveniently this may comprise smaller opaque spots 21 at the beginning and end of each word as shown. These act as a clock to strobe the data into a store. Other means of encoding the information are possible, and colored spots, rather than black ones, may be used to reduce errors and simplify error-correction techniques, or to increase the data packing density.

Figure 5:
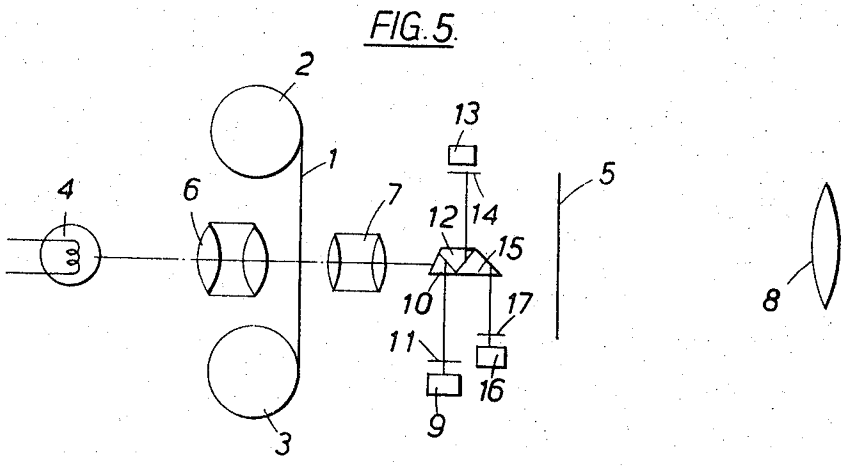
FIG. 5 is a schematic diagram of a third embodiment of the invention.

The embodiments described above are suitable if the information is encoded only in black-and-white. If color coding means are used then the apparatus has to be modified. FIG. 5 shows the apparatus arranged for reading out information encoded by a sequence of colored spots. In addition to the row of photo-electric devices 9 already provided in the first embodiment, two more rows are provided displaced from the first. The simple prism 10 of the first embodiment is replaced by a multiple prism arranged to separate, say, the three primary colors, red, blue and green. The first element 10 of the prism reflects the blue light towards the photo-electric devices 9 through a blue filter 11 and the second element 12 of the filter reflects the red light towards the photo-electric devices 13 through a red filter 14. Similarly the last element of the prism 15 reflects the green light towards the row of photo-electric devices 16 through a green filter 17. As in the first embodiment the distance of the photo-electric devices from their respective prisms are such that the light is focussed onto the photo-electric devices by the projection lens 7.

Figure 6:
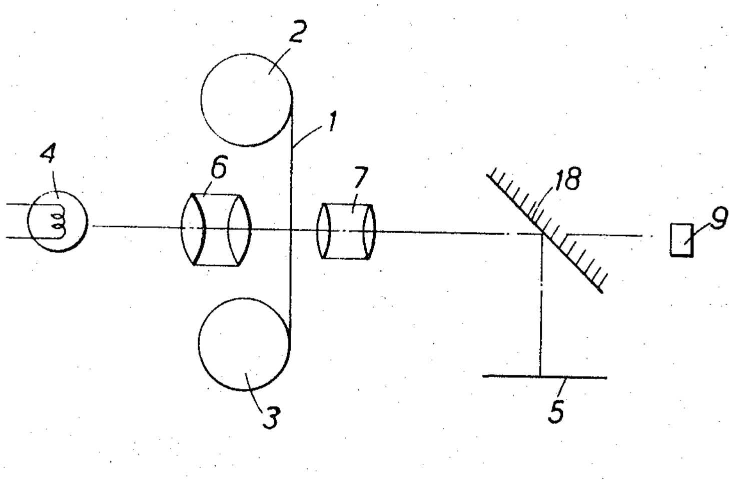
FIG. 6 is a schematic diagram of a further embodiment.

In the event of a folded projection system being used, such as is illustrated schematically in FIG. 6, the photo-electric devices may be arranged in line with that part of the optical axis which passes through the condenser lens 6 and projection lens 7. When the back-up store is required the mirror 18 normally used to "fold" the optical axis of the projection system is removed.

In place of the or each row of photo-electric devices used in the embodiments described above a rectangular array may be used to read more than one character simultaneously.

The means for moving the prisms in the above-described embodiments have not been described as many alternative means may be used. In order to keep the dimensions of the moving-map display as small as possible the prism arrangement will preferably be "stored" adjacent to one of the rows of photo-electric devices.

It will be seen from the above description that the back-up store provided for the moving-map display is relatively inexpensive and simple, since almost all the components are already present in the display itself.

What we claim is:

1. Information storage apparatus which includes a strip of film carrying information to be displayed and encoded digital information, a viewing screen, a light source and an optical system arranged to project an image of at least part of the display information onto the screen, means for moving the film in two coordinate directions so as to display on the screen any required part of the information carried by the film, a plurality of light-sensitive devices located away from the axis of the optical system and extending in a direction transverse to the length of the film, and means for modifying the said optical system in such a manner that light from the light source may be focussed on the film and thence onto the plurality of light-sensitive devices to read out the encoded digital information, said last-named means comprising a movable optical element normally disposed away from the axis of the optical system and movable to a position for diverting all of the light passing through the film away from the screen and onto the light-sensitive devices.

2. Information storage apparatus as claimed in claim 1 in which the means for diverting the light path comprises a reflector movable to a position in which it intersects the light path between the film and the screen.

3. Information storage apparatus as claimed in claim 2 in which the reflector is a mirror.

4. Information storage apparatus as claimed in claim 2 in which the reflector is a prism.

5. Information storage apparatus as claimed in claim 4 which includes a second plurality of light-sensitive devices, the prism being arranged to divert light having different optical characteristics separately to the first and second pluralities of light-sensitive devices.

6. Information storage apparatus as claimed in claim 5 in which light reaching the prism is of different colors, each plurality of light-sensitive devices having a color filter associated therewith.

7. Information storage apparatus which includes a strip of film carrying information to be displayed and encoded digital information, a viewing screen, a light source and an optical system arranged to project an image of at least part of the display information onto the screen, means for moving the film in two coordinate directions so as to display any part thereof on the screen, a plurality of light-sensitive devices located away from the axis of the optical system, and said optical system including a movable optical element normally disposed adjacent the axis of the optical system and movable into a position along said axis to intersect the light path between the film and the screen and to divert all of the light passing through the film away from the screen and onto the light-sensitive devices, said light-sensitive devices being located in such a manner that the light from the light source is focussed on the film and thence onto the plurality of light-sensitive devices to read out the encoded digital information.

8. Information storage apparatus as claimed in claim 7 in which the means for diverting the light path comprises a reflector movable to a position in which it intersects the light path between the film and the screen.

9. Information storage apparatus as claimed in claim 8 in which the reflector is a mirror.

10. Information storage apparatus as claimed in claim 8 in which the reflector is a prism.

11. Information storage apparatus as claimed in claim 10 which includes a second plurality of light-sensitive devices, the prism being arranged to divert light having different optical characteristics separately to the first and second pluralities of light-sensitive devices.

12. Information storage apparatus as claimed in claim 11 in which light reaching the prism is of different colors, each plurality of light-sensitive devices having a color filter associated therewith.

* * * * *